(12) United States Patent
Fletcher

(10) Patent No.: US 12,200,141 B2
(45) Date of Patent: Jan. 14, 2025

(54) SYSTEMS AND METHODS FOR CONDUCTING REMOTE ATTESTATION

(71) Applicant: Capital One Services, LLC, McLean, VA (US)

(72) Inventor: Abel Fletcher, Prosper, TX (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 345 days.

(21) Appl. No.: 17/494,716

(22) Filed: Oct. 5, 2021

(65) Prior Publication Data
US 2023/0109544 A1    Apr. 6, 2023

(51) Int. Cl.
  *H04L 9/32* (2006.01)
  *G06Q 50/18* (2012.01)
  *H04L 9/00* (2022.01)

(52) U.S. Cl.
  CPC .......... *H04L 9/3247* (2013.01); *G06Q 50/18* (2013.01); *H04L 9/3213* (2013.01); *H04L 9/3226* (2013.01); *H04L 9/3239* (2013.01); *H04L 9/50* (2022.05)

(58) Field of Classification Search
  CPC ... H04L 9/3247; H04L 9/3213; H04L 9/3226; H04L 9/3239; H04L 9/50; G06Q 50/18
  See application file for complete search history.

(56) References Cited

U.S. PATENT DOCUMENTS

| | | | | |
|---|---|---|---|---|
| 7,934,098 B1* | 4/2011 | Hahn | ...................... | G06Q 50/18 713/180 |
| 9,807,610 B2 | 10/2017 | Rasheed et al. | | |
| 10,255,419 B1* | 4/2019 | Kragh | ...................... | G06F 21/32 |
| 10,943,680 B1* | 3/2021 | Knas | ...................... | H04L 9/3239 |
| 2008/0240447 A1* | 10/2008 | Zhu | ........................ | H04L 9/3271 380/30 |
| 2015/0178721 A1* | 6/2015 | Pandiarajan | ..... | G06K 19/06112 705/64 |

(Continued)

FOREIGN PATENT DOCUMENTS

| | | | |
|---|---|---|---|
| CN | 110661800 A | | 1/2020 |
| KR | 20130010593 A | * | 1/2013 |
| KR | 20230026043 A | * | 2/2023 |

*Primary Examiner* — Luu T Pham
*Assistant Examiner* — Paul J Skwierawski
(74) *Attorney, Agent, or Firm* — TROUTMAN PEPPER HAMILTON SANDERS LLP; Christopher J. Forstner; John A. Morrissett

(57) ABSTRACT

Disclosed embodiments may include a system that may receive a document associated with an entity and may generate a first hash associated with the document. The system may prompt a first user to provide a first signature of the document and may generate a second hash associated with the first signature. The system may prompt the first user to provide authentication information and may determine whether received authentication information matches stored authentication information. In response to determining the authentication information matches the stored authentication information, the system may prompt a second user to provide a second signature of the document, may generate a third hash associated with the second signature, may generate a fourth hash associated with a verified record of the first, second, and third hashes, may generate a block comprising the first, second, third, and fourth hashes, and may publish the block to a blockchain.

20 Claims, 9 Drawing Sheets

(56) References Cited

U.S. PATENT DOCUMENTS

| | | | |
|---|---|---|---|
| 2016/0086176 A1* | 3/2016 | Silva Pinto | H04W 12/106 |
| | | | 705/44 |
| 2018/0183586 A1 | 6/2018 | Bhargav-Spantzel et al. | |
| 2018/0365448 A1* | 12/2018 | Uhr | G06Q 20/36 |
| 2018/0375659 A1 | 12/2018 | Kozma et al. | |
| 2022/0131858 A1* | 4/2022 | Short, III | H04L 63/08 |

\* cited by examiner

SYSTEMS AND METHODS FOR CONDUCTING REMOTE ATTESTATION

FIELD

The disclosed technology relates to systems and methods for conducting remote attestation, and more particularly, for conducting remote attestation based on the use of blockchain and multi-factor authentication.

BACKGROUND

Modern society relies heavily on virtual and remote processes. The authentication and verification of people, however—as required processes in numerous situations, such as buying a house, purchasing transportation tickets, getting documents notarized, etc.—still rely primarily on physical or in-person actions. This is due to the fact that certain transactions and authentications require certainty of identification, which oftentimes is thought to be more easily achievable in an in-person versus virtual setting. Some traditional virtual systems and methods rely on some form of multi-factor identification, such that an individual must put forth multiple forms of identification, for example a typed password and a response to a mobile phone push notification, in order to complete a transaction (e.g., logging into an online bank account). Many users and organizations, however, remain wary of relying on these methods for conducting certain transactions as imposters may still find ways to hack the systems.

Accordingly, there is a need for improved systems and methods for conducting remote attestation. Embodiments of the present disclosure are directed to this and other considerations.

SUMMARY

Disclosed embodiments may include a system for conducting remote attestation. The system may include one or more processors, and memory in communication with the one or more processors and storing first instructions that are configured to cause the system to perform a method for conducting remote attestation. The system may receive a first document associated with an entity. The system may generate a first hash associated with the first document. The system may prompt a first user to provide, via a first user device associated with the first user, a first signature of the first document. The system may receive the first signature of the first document from the first user device. The system may generate a second hash associated with the first signature of the first document. The system may prompt the first user, via the first user device, to provide authentication information. The system may receive, from the first user via the first user device, the authentication information. The system may determine whether the authentication information matches stored authentication information. In response to determining that the authentication information matches the stored authentication information, the system may prompt a second user to provide, via a second user device associated with the second user, a second signature of the first document, may receive the second signature of the first document from the second user device, may generate a third hash associated with the second signature of the first document, may generate a fourth hash associated with a verified record of the first hash, the second hash, and the third hash, may generate a first block comprising the first hash, the second hash, the third hash, and the fourth hash, and may publish the first block to a public blockchain, wherein the authentication information comprises three or more required authentication factors comprising three or more of a personal identification number (PIN), a physical token, a facial recognition, a thumbprint image, a retina scan, an encrypted quick response (QR) code, or combinations thereof.

In another embodiment, the system may include one or more processors, and memory in communication with the one or more processors and storing first instructions that are configured to cause the system to perform a method for conducting remote attestation. The system may receive a first document associated with an entity. The system may generate a first hash associated with the first document. The system may prompt a first user to provide, via a first user device associated with the first user, a first signature of the first document. The system may receive the first signature of the first document from the first user device. The system may generate a second hash associated with the first signature of the first document. The system may prompt the first user, via the first user device, to provide authentication information. The system may receive, from the first user via the first user device, the authentication information. The system may determine whether the authentication information matches stored authentication information. In response to determining that the authentication information matches the stored authentication information, the system may prompt a second user to provide, via a second user device associated with the second user, a second signature of the first document, may receive the second signature of the first document from the second user device, may generate a third hash associated with the second signature of the first document, may generate a fourth hash associated with a verified record of the first hash, the second hash, and the third hash, may generate a first block comprising the first hash, the second hash, the third hash, and the fourth hash, and may publish the first block to a public blockchain, wherein the authentication information comprises a first encrypted QR code and two or more required authentication factors comprising two or more of a personal PIN, a physical token, a facial recognition, a thumbprint image, a retina scan, or combinations thereof.

In another embodiment, the system may include one or more processors, and memory in communication with the one or more processors and storing first instructions that are configured to cause the system to perform a method for conducting remote attestation. The system may receive a first document associated with an entity. The system may generate a first hash associated with the first document. The system may prompt a first user to provide, via a first user device associated with the first user, a first signature of the first document. The system may receive the first signature of the first document from the first user device. The system may generate a second hash associated with the first signature of the first document. The system may prompt the first user, via the first user device, to provide three or more required authentication factors. The system may receive, from the first user via the first user device, the three or more required authentication factors. The system may determine that the three or more required authentication factors match three or more stored authentication factors. The system may prompt a second user to provide, via a second user device associated with the second user, a second signature of the first document. The system may receive the second signature of the first document from the second user device. The system may generate a third hash associated with the second signature of the first document. The system may generate a fourth hash associated with a verified record of the first hash, the second hash, and the third hash. The system may generate a first block comprising the first hash, the second hash, the third hash, and the fourth hash. The system may publish the first block to a blockchain.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure relate to systems and methods for conducting remote attestation. In particular, the disclosed technology relates to systems and methods for receiving a document associated with an entity, generating a first hash associated with the document, authenticating a first user via multi-factor authentication, prompting a first and second user to provide signatures of the document, generating a second hash associated with the first user's signature and a third hash associated with the second user's signature, generating a fourth hash comprising a verified record of the first, second, and third hashes, generating a first block comprising the first, second, third, and fourth hashes, and publishing the first block to a blockchain. Distributed blockchain systems can simultaneously record transaction-related entries (e.g., user-specific authentication of a document) in multiple places. Unlike traditional centralized ledgers, which typically rely on a central authority to validate the authenticity of transactions recorded in a database and make the system susceptible to lost information, tampering, validation delays, etc., such blockchain systems typically have no centralized data store. Instead, transactions are bundled into blocks that are chained together and then broadcasted to other nodes in a network. The systems and methods described herein are thus necessarily rooted in computer and technology as they utilize multi-factor authentication and blockchain to conduct remote, i.e., virtual, authentication and attestation of a user.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
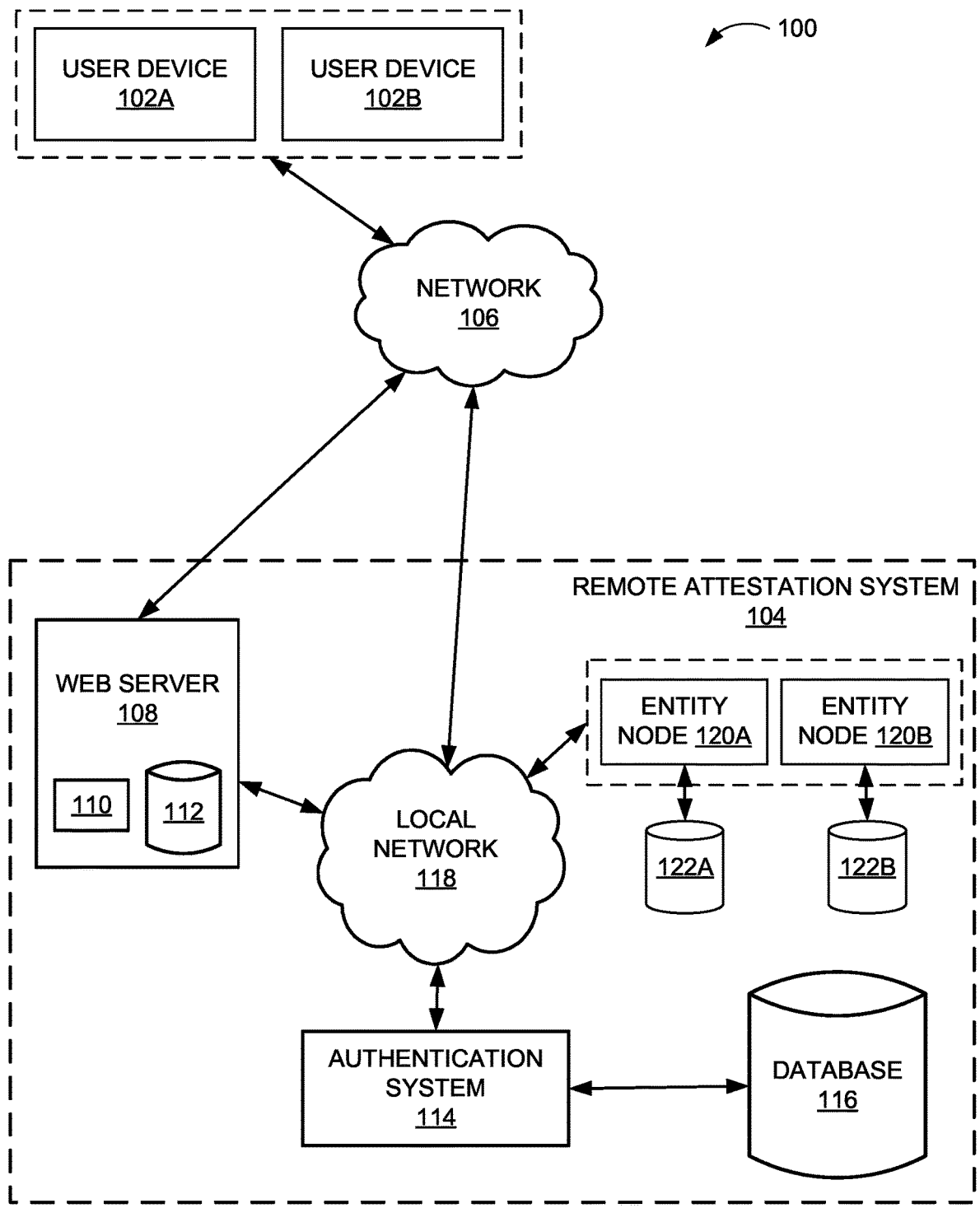
FIG. 1 is a block diagram of an example system that may be used to conduct remote attestation, according to an example implementation of the disclosed technology.

FIG. 1 is a block diagram of an example system that may be used to conduct remote attestation, according to an example implementation of the disclosed technology. The components and arrangements shown in FIG. 1 are not intended to limit the disclosed embodiments as the components used to implement the disclosed processes and features may vary. As shown, remote attestation system 104 may interact with a plurality of user devices 102 (individually user device 102A, 102B, etc.) via a network 106. In certain example implementations, the remote attestation system 104 may include a local network 118, an authentication system 114, a web server 108, a database 116, and a plurality of entity nodes 120 (individually 120A, 120B, etc.). Each entity node may be associated with an entity and exclusively capable of creating and issuing documents within the system 100. Each entity node may also be capable of acting as a verification node, as further discussed below. It is to be understood that any entity node (e.g., entity node 120A) may consist of a single node or multiple nodes all affiliated with a single entity.

The plurality of user devices 102 may not create any type of document within system 100, but system 100 may enable the plurality of entity nodes 120 to transfer existing documents to one or more of the user devices 102. Each user device 102 may also transfer one or more documents to any other user device 102 (e.g., a transfer of a document from the user device 102A to the user device 102B). Whenever a transaction involving a document occurs within system 100, the entity node 120 responsible for the transaction may send a transaction receipt to one or more of the entity nodes 120 in order to record the transaction, where the respective entity node 120 may store the transaction on an entity database 122 (e.g., each entity node 120A corresponds to a respective entity database 122A). It is to be understood that the entity database 122 may be a single database or multiple databases associated with the corresponding entity node 120.

In some embodiments, one or more users may operate user devices 102. User devices 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of the remote attestation system 104. In some embodiments, user devices 102 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the remote attestation system 104. According to some embodiments, user devices 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may include any type of computer networking arrangement used to exchange data. For example, network 106 may be the Internet, a private data network, virtual private network using a public network, and/or other suitable connection(s) that enable(s) components in the system 100 environment to send and receive information between the components of system 100. Network 106 may also include a public switched telephone network ("PSTN") and/or a wireless network.

Remote attestation system 104 may be associated with and optionally controlled by one or more entities such as a business, corporation, individual, partnership, or any other entity that provides one or more of goods, services, and consultations to individuals such as customers. In some embodiments, remote attestation system 104 may be controlled by a third party on behalf of another business, corporation, individual, partnership. Remote attestation system 104 may include one or more servers and computer systems for performing one or more functions associated with products and/or services that the organization provides.

Web server 108 may include a computer system configured to generate and provide one or more websites accessible to customers, as well as any other individuals involved in access system 100's normal operations. Web server 108 may include a computer system configured to receive communications from user devices 102 via for example, a mobile application, a chat program, an instant messaging program, a voice-to-text program, an SMS message, email, or any other type or format of written or electronic communication. Web server 108 may have one or more processors 110 and one or more web server databases 112, which may be any suitable repository of website data. Information stored in web server 108 may be accessed (e.g., retrieved, updated, and added to) via local network 118 and/or network 106 by one or more devices or systems (e.g., authentication system 114) of system 100. In some embodiments, web server 108 may host websites or applications that may be accessed by user devices 102. For example, web server 108 may host a financial service provider website that a user device may access by providing an attempted login that are authenticated by authentication system 114. According to some embodiments, web server 108 may include software tools, similar to those described with respect to user devices 102, that may allow web server 108 to obtain network identification data from user devices 102.

Local network 118 may include any type of computer networking arrangement used to exchange data in a localized area, such as WiFi, Bluetooth™ Ethernet, and other suitable network connections that enable components of remote attestation system 104 to interact with one another and to connect to network 106 for interacting with components in the system 100 environment. In some embodiments, local network 118 may include an interface for communicating with or linking to network 106. In other embodiments, certain components of remote attestation system 104 may communicate via network 106, without a separate local network 118.

In accordance with certain example implementations of the disclosed technology, remote attestation system 104 may include one or more computer systems configured to compile data from a plurality of sources, for example, authentication system 114, web server 108, and/or database 116. Authentication system 114 may correlate compiled data, analyze the compiled data, arrange the compiled data, generate derived data based on the compiled data, and store the compiled and derived data in a database such as database 116. According to some embodiments, database 116 may be a database associated with an organization and/or a related entity that stores a variety of information relating to customers, transactions, ATM, and business operations. Database 116 may also serve as a back-up storage device and may contain data and information that is also stored on, for example, database 260, as discussed below with reference to FIG. 2.

Although the preceding description describes various functions of a web server 108, an authentication system 114, and a database 116, in some embodiments, some or all of these functions may be carried out by a single computing device or a plurality of computing devices in a (cloud) serverless system.

Figure 2:
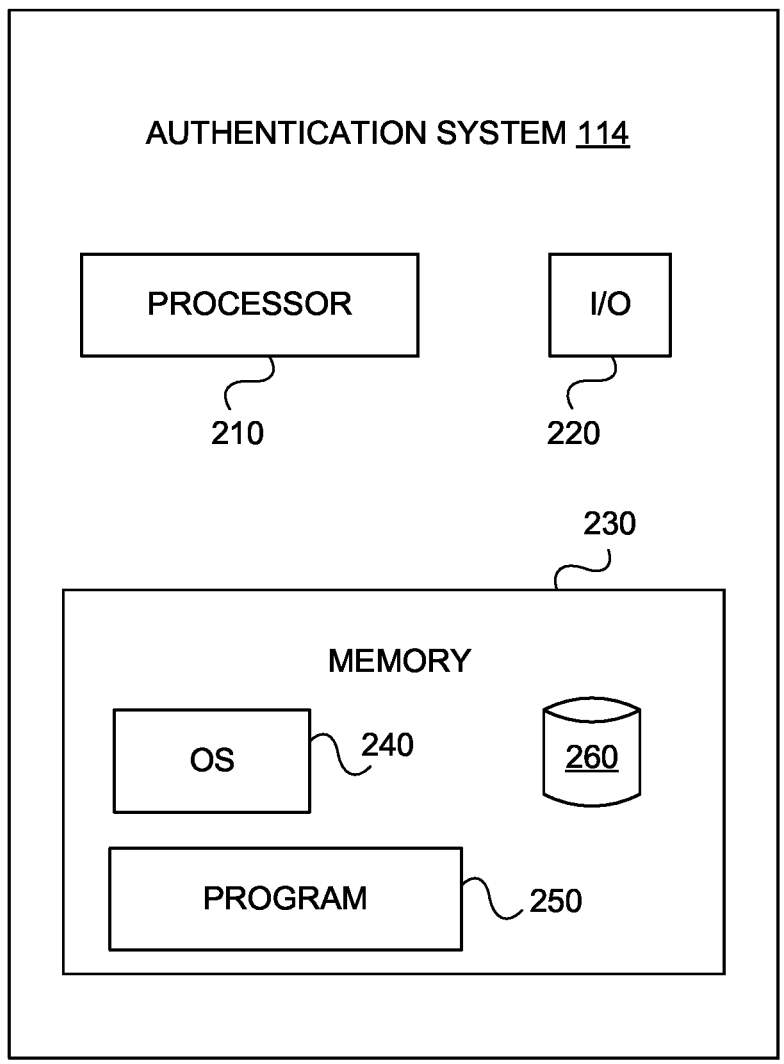
FIG. 2 is a block diagram of an example authentication system used to remotely authenticate a user, according to an example implementation of the disclosed technology.

An example embodiment of authentication system 114 is shown in more detail in FIG. 2. According to some embodiments, user devices 102, web server 108, and entity nodes 120, as depicted in FIG. 1 and described above, may have a similar structure and components that are similar to those described with respect to authentication system 114 shown in FIG. 2. As shown, authentication system 114 may include a processor 210, an input/output ("I/O") device 220, a memory 230 containing an operating system ("OS") 240, a program 250, and a database 260.

In certain example implementations, authentication system 114 may be a single server or may be configured as a distributed computer system including multiple servers or computers that interoperate to perform one or more of the processes and functionalities associated with the disclosed embodiments. In some embodiments, authentication system 114 may be one or more servers from a serverless or scaling server system. In some embodiments, authentication system 114 may further include a peripheral interface, a transceiver, a mobile network interface in communication with processor 210, a bus configured to facilitate communication between the various components of authentication system 114, and a power source configured to power one or more components of authentication system 114.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a USB port, a micro-USB port, a high-definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: RFID, NFC, Bluetooth™, BLE, WiFi™, ZigBee™, ABC protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within memory 230.

Processor 210 may be one or more known processing devices, such as, but not limited to, a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc., multiple software processes, applications, programs, etc. One of ordinary skill in the art would understand that other types of processor arrangements could be implemented that provide for the capabilities disclosed herein.

In accordance with certain example implementations of the disclosed technology, authentication system 114 may include one or more storage devices configured to store information used by processor 210 (or other components) to perform certain functions related to the disclosed embodiments. In one example, authentication system 114 may include memory 230 that includes instructions to enable processor 210 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, authentication system 114 may include a memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, authentication system 114 may include memory 230 that may include one or more programs 250 to perform one or more functions of the disclosed embodiments. For example, in some embodiments, authentication system 114 may additionally manage dialogue and/or other interactions with the customer via a program 250.

Processor 210 may execute one or more programs located remotely from authentication system 114. For example, authentication system 114 may access one or more remote programs that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include database 260 for storing related data to enable authentication system 114 to perform one or more of the processes and functionalities associated with the disclosed embodiments.

Authentication system 114 may also be communicatively connected to one or more memory devices (e.g., databases) locally or through a network. The remote memory devices may be configured to store information and may be accessed and/or managed by authentication system 114. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Authentication system 114 may also include one or more I/O devices 220 that may comprise one or more interfaces for receiving signals or input from devices and providing signals or output to one or more devices that allow data to be received and/or transmitted by authentication system 114. For example, authentication system 114 may include interface components, which may provide interfaces to one or more input devices, such as one or more keyboards, mouse devices, touch screens, track pads, trackballs, scroll wheels, digital cameras, microphones, sensors, and the like, that enable authentication system 114 to receive data from a user (such as, for example, via user devices 102).

In example embodiments of the disclosed technology, authentication system 114 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While authentication system 114 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of authentication system 114 may include a greater or lesser number of components than those illustrated.

Figure 3:
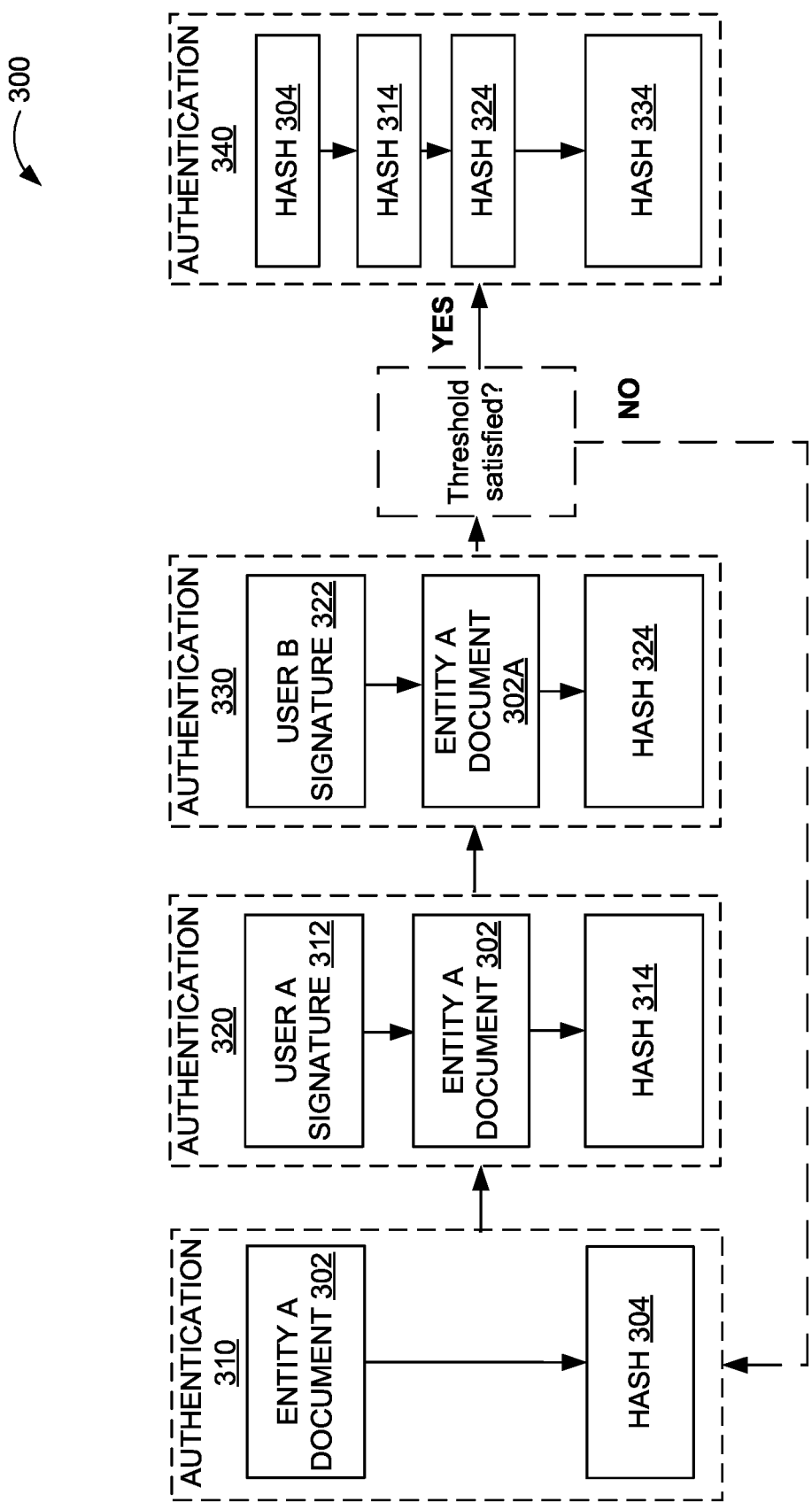
FIG. 3 is a flow diagram for a document authentication history in which entity A issues a document to user A, who signs and transfers the document to user B, who signs and authenticates the document, according to an example implementation of the disclosed technology.

FIG. 3 is a flow diagram for a chain of ownership in which each entity or user transfers a document to each successive recipient, in turn, by digitally ratifying the authentication including a hash of the previous authentication, in accordance with certain embodiments of the disclosed technology. It is to be understood that an authentication (e.g., authentication 310) may include a user to user, user to entity, or entity to entity document authentication. Method 300 may be performed by one or more components of system 100 (e.g., authentication system 114 or web server 108 of remote attestation system 104 or user devices 102), as described above with respect to FIGS. 1 and 2.

In a first authentication 310, the system (e.g., via an entity node 120 of remote attestation system 104) may generate an entity A document 302. For example, entity A may be affiliated with a financial institution and may issue entity A document 302 that requires a user signature and notarization to be accepted by the financial institution. In authentication block 310, the system (e.g., via remote attestation system 104) may generate a cryptographic hash 304 corresponding to the un-signed and un-notarized entity A document issued by entity A, i.e., the cryptographic hash 304 comprises some form of digital identification or signature by entity A (e.g., a seal or timestamp).

In a second authentication 320, the system (e.g., via remote attestation system 104) may receive a user A signature 312 of entity A document 302. For example, user A (e.g., a customer of the financial institution) may have received entity A document 302 from entity A remotely, e.g., via email or an application associated with entity A, and may be required to provide a signature, e.g., digitally, on entity A document 302. Once the system receives user A signature 312 of entity A document 302, the system (e.g., via remote attestation system 104) may generate a cryptographic hash 314 corresponding to the entity A document 302 (comprising the cryptographic hash 304) now including the user A signature 312.

In a third authentication 330, the system (e.g., via remote attestation system 104) may receive a user B signature 322 of entity A document 302A, i.e., the entity A document 302 including the user A signature 312. For example, user B (e.g., a notary) may have received entity A document 302A from user A remotely, e.g., via a mobile application, and may also be required to provide a signature, e.g., digitally, on entity A document 302A. Once the system receives user B signature 322 of entity A document 302A, the system (e.g., via remote attestation system 104) may generate a cryptographic hash 324 corresponding to the entity document 302A (comprising the cryptographic hashes 304 and 314) now including the user B signature 322.

In some embodiments, the system (e.g., via remote attestation system 104) may determine whether a predetermined threshold has been satisfied. The predetermined threshold may be, for example, a period of time that must have elapsed (e.g., thirty minutes) or a threshold number of transactions that must have been conducted, in order for the system to proceed with generating a block, as further discussed below. For example, authentication 310, authentication 320, and authentication 330, as depicted in FIG. 3, together comprise a transaction involving a single document, i.e., entity A document 302. The system may be configured to wait to generate a block until at least three separate transactions, or document authentication processes, have been completed. Once this threshold has been satisfied, the system may continue onto generating a block, as discussed below.

Upon satisfying the predetermined threshold, the system, in a fourth authentication 340, may (e.g., via remote attestation system 104) generate a cryptographic hash 334 corresponding to a verified record of cryptographic hashes 304, 314, and 324, and corresponding to the entity document 302A now including both the user A signature 312 and the user B signature 322. Once cryptographic hash 334 is generated, the system (e.g., via remote attestation system 104) may be configured to generate a block comprising cryptographic hashes 304, 314, 324, and 334, and to publish the block to a blockchain. In such embodiments where the predetermined threshold comprises, for example, three separate transactions (document authentication processes), as described above, authentication 340 would include generating a cryptographic hash corresponding to a verified record of all cryptographic hashes from the three separate document authentication processes. That is, for each of the three documents authenticated, there would be three hashes, making a total of nine hashes. The final generated hash (e.g., hash 334) would then correspond to a verified record of each of those nine hashes, and each of the three documents and its respective signatures.

A hash (e.g., hash 314) is a uniquely identifying cryptographic 'fingerprint' of a specified amount of data. The same hash will always result from the same data, but even the slightest or bitwise change to the data will significantly change the value of the hash, and thus change the alignment or correspondence between all hashes in that respective chain. The cryptographic hash of a combination of the authentication's output and the signature of the next owner is appended to the end of the chain of ownership. A recipient may verify the hashes and corresponding digital signatures in order to verify the chain of ownership.

In order to verify the chain of ownership without a trusted intermediary, transactions, e.g., authentications, may be publicly broadcast, and a system of verification employed for participants to agree on a single history of the distributed ledger. That is, the recipient of the document requires proof that, at the time of the authentication, all nodes (e.g., entity nodes 120) having received the corresponding authentication receipt have verified the chain of ownership information contained within the cryptographic hash.

In exemplary embodiments of the present disclosure, such a blockchain is maintained by the system of communicating nodes connected by the network 106. Authentications may be validated by entity node 120A, added to that node's copy of the ledger, and then broadcast to one or more entity nodes 120B, 120C, etc. The receiving entity nodes 120 may then store a copy of the blockchain. Each new block incorporates a group of verified authentications, and is added to the blockchain, which is published to a plurality of nodes.

Figure 4A:
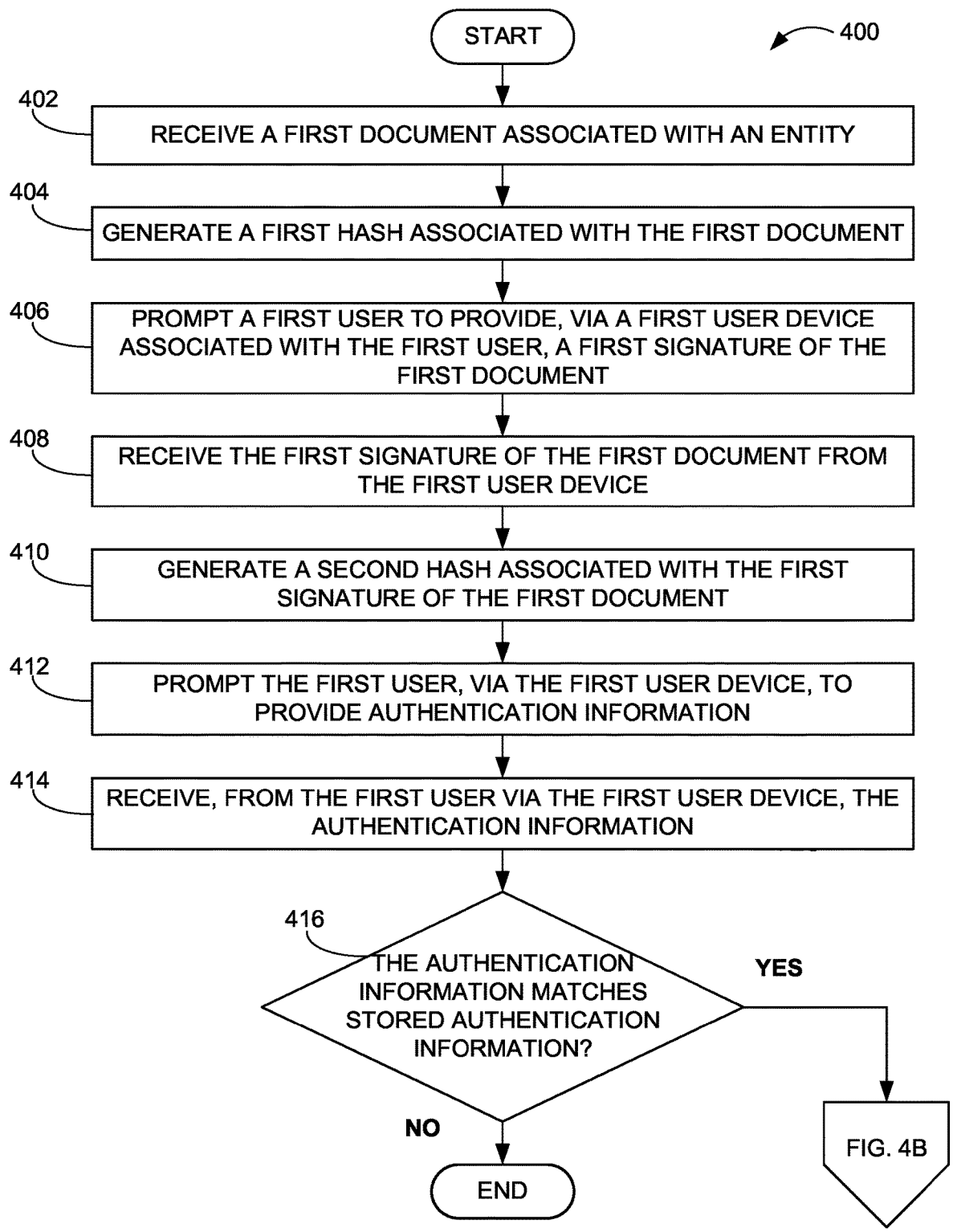
FIGS. 4A-4B are a flow diagram illustrating an exemplary method for conducting remote attestation, in accordance with certain embodiments of the disclosed technology.
Figure 4B:
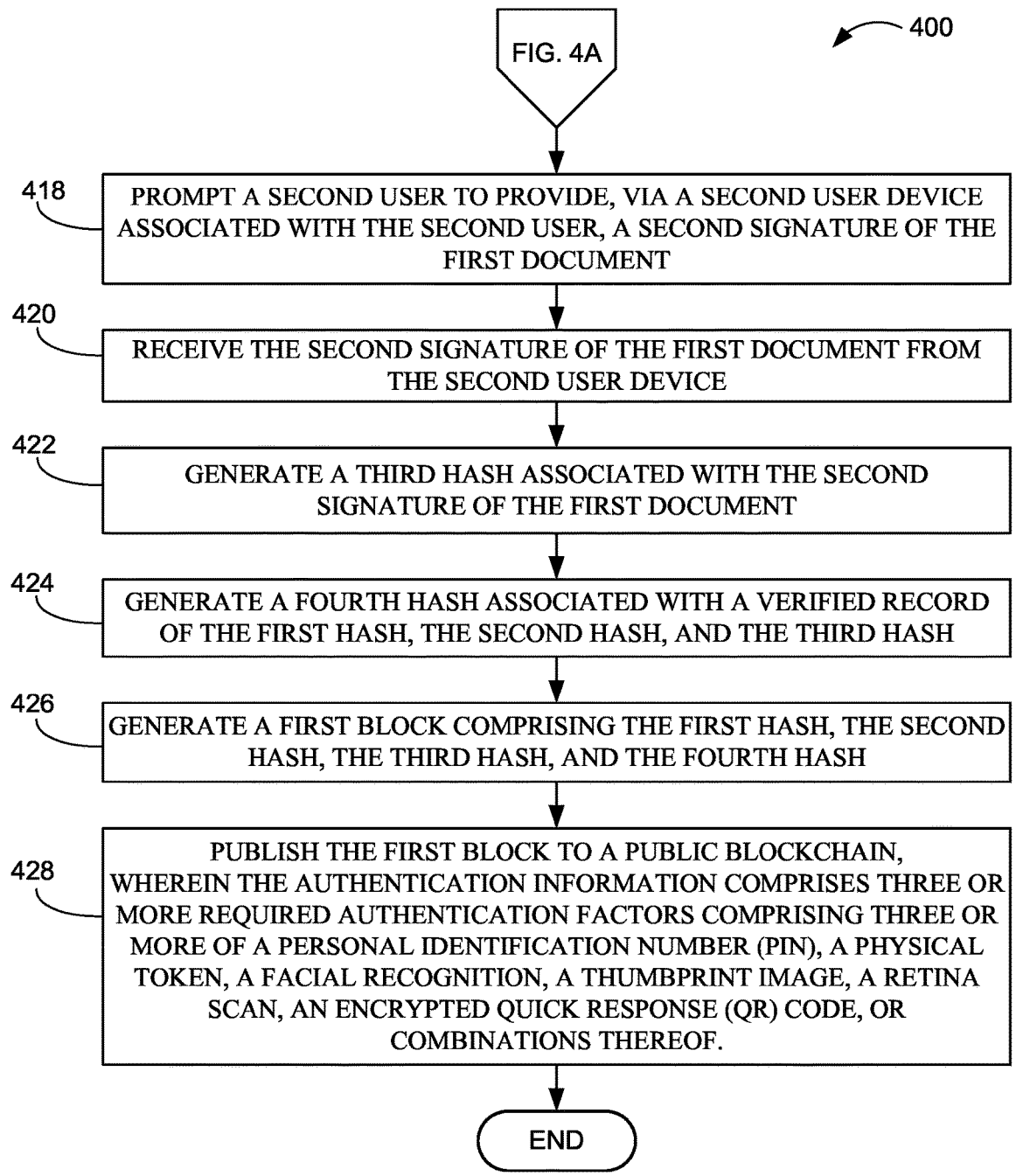

FIGS. 4A-4B provide a flow diagram illustrating an exemplary method 400 for conducting remote attestation, in accordance with certain embodiments of the disclosed technology. Method 400 may be performed by one or more components of system 100 (e.g., remote attestation system 104 or user devices 102), as described above with respect to FIGS. 1 and 2.

In block 402 of FIG. 4A, the system (e.g., via remote attestation system 104) may receive a first document associated with an entity. For example, the entity may be a financial institution and the first document may comprise a document requiring a signature by a customer of the financial institution as well as notarization by a public notary.

In block 404, the system (e.g., via remote attestation system 104) may generate a first hash associated with the first document. That is, as described above with respect to authentication 310 of FIG. 3, the system may generate a first hash comprising some form of digital identification or signature of the entity.

In block 406, the system (e.g., via remote attestation system 104) may prompt a first user to provide, via a first user device associated with the first user, a first signature of the first document. As described above with respect to authentication 320 of FIG. 3, a first user may have received the first document from the entity remotely, e.g., via email or an application associated with the entity, and may be required to provide a signature on the document. For example, the first user may be prompted to enter his or her signature via a graphical user interface (GUI) of an application running on the first user's mobile device (e.g., a laptop).

In block 408, the system (e.g., via remote attestation system 104) may receive the first signature of the first document from the first user device. For example, the first user may digitally sign the document via a GUI of an application running on the first user's mobile device (e.g., a laptop).

In block 410, the system (e.g., via remote attestation system 104) may generate a second hash associated with the first signature of the first document. That is, as described above with respect to authentication 320 of FIG. 3, the system may generate a second hash comprising the first document, the first user's signature of the first document, and the first hash (as discussed above in block 404).

In block 412, the system (e.g., via authentication system 114) may prompt the first user, via the first user device, to provide authentication information. That is, prior to being able to request a second signature of the first document by a second user (e.g., a notary), as further described below, the system may prompt the first user, e.g., via a GUI of the first user's mobile device (e.g., a laptop), for authentication information to verify the identify of the first user. In some embodiments, the authentication information may comprise one or more required authentication factors comprising a PIN, a physical token, a facial recognition, a thumbprint image, a retina scan, an encrypted QR code, or combinations thereof. A physical token may be a physical or virtual device that is capable of generating a one-time pin (OTP) (e.g., Google Authenticator™, RSA token generator, etc.). An encrypted QR code may comprise a graphical representation of a cryptographic key pair.

In block 414, the system (e.g., via authentication system 114) may receive the authentication information from the first user. Each of the above-mentioned authentication factors may be provided to the system in multiple ways. For example, the first user may enter, e.g., type, a PIN into a GUI of the first user's mobile device (e.g., a laptop). The first user may utilize an image capture device, e.g., a camera, on the first user's mobile device to provide a facial recognition or scan. The first user may utilize a thumbprint scanner connected to the first user's mobile device to provide a thumbprint image. The first user may utilize a retina scanner connected to the first user's mobile device to provide a retina scan. Alternatively, for one or more of the above-mentioned authentication factors, the first user may run an application via a GUI of the first user's mobile device, wherein the application itself provides different types of biometric scanners that may require the use of the mobile device's internal image capture device (e.g., a camera) to operate fully. In some embodiments, the first user may provide the one or more authentication factors by utilizing a removeable memory device or card that contains a private key to prove the first user's identity.

In some embodiments where the first user is required to provide an encrypted QR code, the system (e.g., via authentication system 114) may be configured to prompt the first user via a separate user device associated with the first user, such as the first user's mobile phone. For example, while the first user may be prompted to provide certain authentication information via his or her laptop, the first user may be prompted to provide other authentication information, such as an encrypted QR code, via a mobile phone. In such case, the first user may receive a push notification to his or her mobile phone prompting him or her to generate the encrypted QR code on a GUI of the mobile phone, and to then hold the mobile phone up to the laptop computer such that the system, e.g., running via an application on the laptop, may identify the generated encrypted QR code as being in alignment with the push notification request. In some embodiments, the first user may be in communication with a second user (e.g., a notary) via a video capable software (e.g., Zoom®, Microsoft Skype™, etc.). The first user may generate the encrypted QR code on his or her mobile phone and hold the mobile phone up to his or her laptop screen such that the system may similarly identify alignment between the generated QR code and the request. The second user may also capture the QR code via an image capture device (e.g., a camera) on his or her own laptop or other mobile device should the second user wish to archive the generated QR code.

In some embodiments, the required authentication factors may be customizable by the first and/or the second user. For example, the first user may pre-select how many and/or which authentication factors he or she wants to ensure be provided upon authenticating certain types of documents. Alternatively, the second user, e.g., a notary, may pre-select how many and/or which authentication factors the first user must provide in order for the second user to provide his or her own signature and notary of the document, as further discussed below.

In decision block 416, the system (e.g., via authentication system 114) may determine whether the authentication information provided by the first user matches stored authentication information. That is, the system may be configured to have previously stored the above-mentioned authentication factors associated with the first user, such as when the first user and/or second user first set up his or her customizable selections of how many and/or which authentication factors should be provided with authentication of certain document types, as described above. The system may then be configured to, upon receiving each authentication factor from the first user, compare the received authentication factor to its respective stored authentication factor to determine whether there is a match between them so as to accurately authenticate the first user's identity. In such cases where an encrypted QR code is required, a second user (e.g., a notary) in communication with the first user (e.g., via a video capable software, as discussed above), may have the capability to send the first user a request to provide the encrypted QR code. Once the first user receives the second user's request (e.g., via a GUI of the first user's mobile phone), generates the QR code based on the request, and displays the generated QR code to the second user (e.g., by holding the first user's mobile phone up to the first user's laptop, as described above), the QR code may be automatically authenticated or confirmed upon the second user capturing the QR code via his or her own device, as described above.

In response to determining the received authentication information does not match the stored authentication information, the system may pause or end the attestation process, e.g., by transmitting a message to the first and/or second user indicating the first user's identity was not properly identified. In some embodiments, the system may be configured to enable the first user to re-provide previously provided authentication information (e.g., re-take a retina scan), or to provide additional authentication information (e.g., additional authentication factors not yet provided to the system). In some embodiments, the system may be configured to re-issue an authentication request, i.e., re-prompt the first user, e.g., via the first user device, to provide the authentication information. In some embodiments, whether the first user may re-provide authentication information or provide additional authentication information may also be customizable by the first and/or second user.

However, in response to determining the received authentication information matches the stored authentication information, the system, in block 418 of FIG. 4B (e.g., via remote attestation system 104) may prompt a second user to provide, via a second user device associated with the second user, a second signature of the first document. The second user (e.g., a notary) may have received the first document from the first user (e.g., via a mobile application) once the first user signed the first document and the first user's identity was properly authenticated, as discussed above. The second user may then be prompted to enter his or her signature, e.g., via a GUI of an application running on the second user's mobile device (e.g., a laptop).

In block 420, the system (e.g., via remote attestation system 104) may receive the second signature of the first document from the second user device. For example, the second user may digitally sign the document via a GUI of an application running on the second user's mobile device (e.g., a laptop).

In block 422, the system (e.g., via remote attestation system 104) may generate a third hash associated with the second signature of the first document. That is, as described above with respect to authentication 330 of FIG. 3, the system may generate a third hash comprising the first document, the first user's signature of the first document, the second user's signature of the first document, and the second hash (as discussed above in block 410).

In block 424, the system (e.g., via remote attestation system 104) may generate a fourth hash comprising the first document, the first user's signature of the first document, the second user's signature of the first document, and a verified record of the first hash, the second hash, and the third hash, as also described above with respect to authentication 340 of FIG. 3.

In block 426, the system (e.g., via remote attestation system 104) may generate a first block comprising the first hash, the second hash, the third hash, and the fourth hash. A generated block must contain hashes corresponding to all associated signatures, as discussed above. Additionally, a generated block must contain the previous hash, i.e., each generated block points to the block that came immediately before the generated block.

In block 428, the system (e.g., via remote attestation system 104) may publish the first block to a blockchain (e.g., a public blockchain). That is, based on the system having received the second signature of the first document from the second user, the second user may send the authenticated document to one or more verification nodes (e.g., entity nodes 120) for verification, as discussed above. The one or more verification nodes must then reach a consensus that the first document was properly authenticated and that no hash included in the first block was changed or compromised in any way, as discussed above. Once consensus is reached, the first block may be appended, or published, to the blockchain.

Figure 5A:
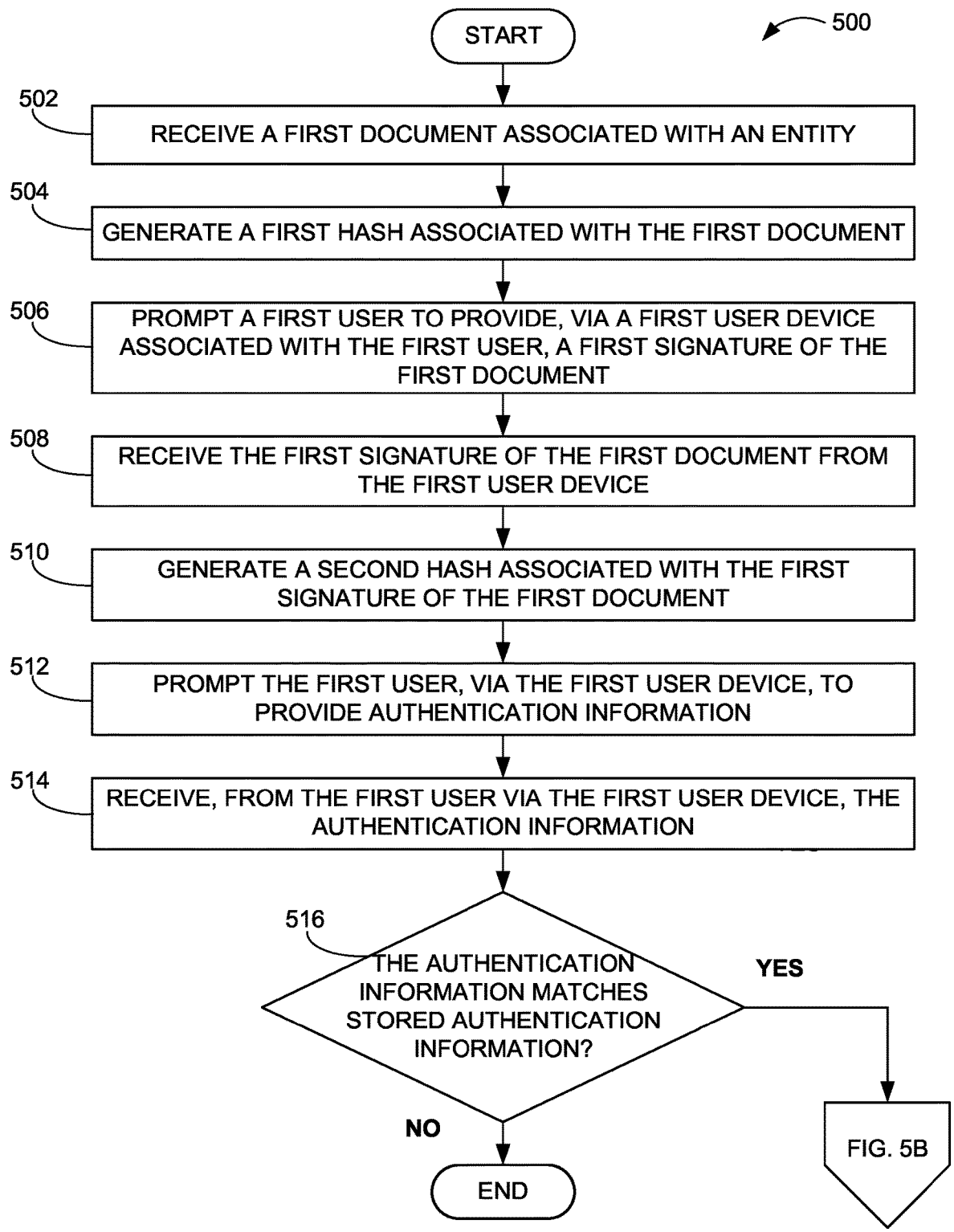
FIGS. 5A-5B are a flow diagram illustrating an exemplary method for conducting remote attestation, in accordance with certain embodiments of the disclosed technology.
Figure 5B:
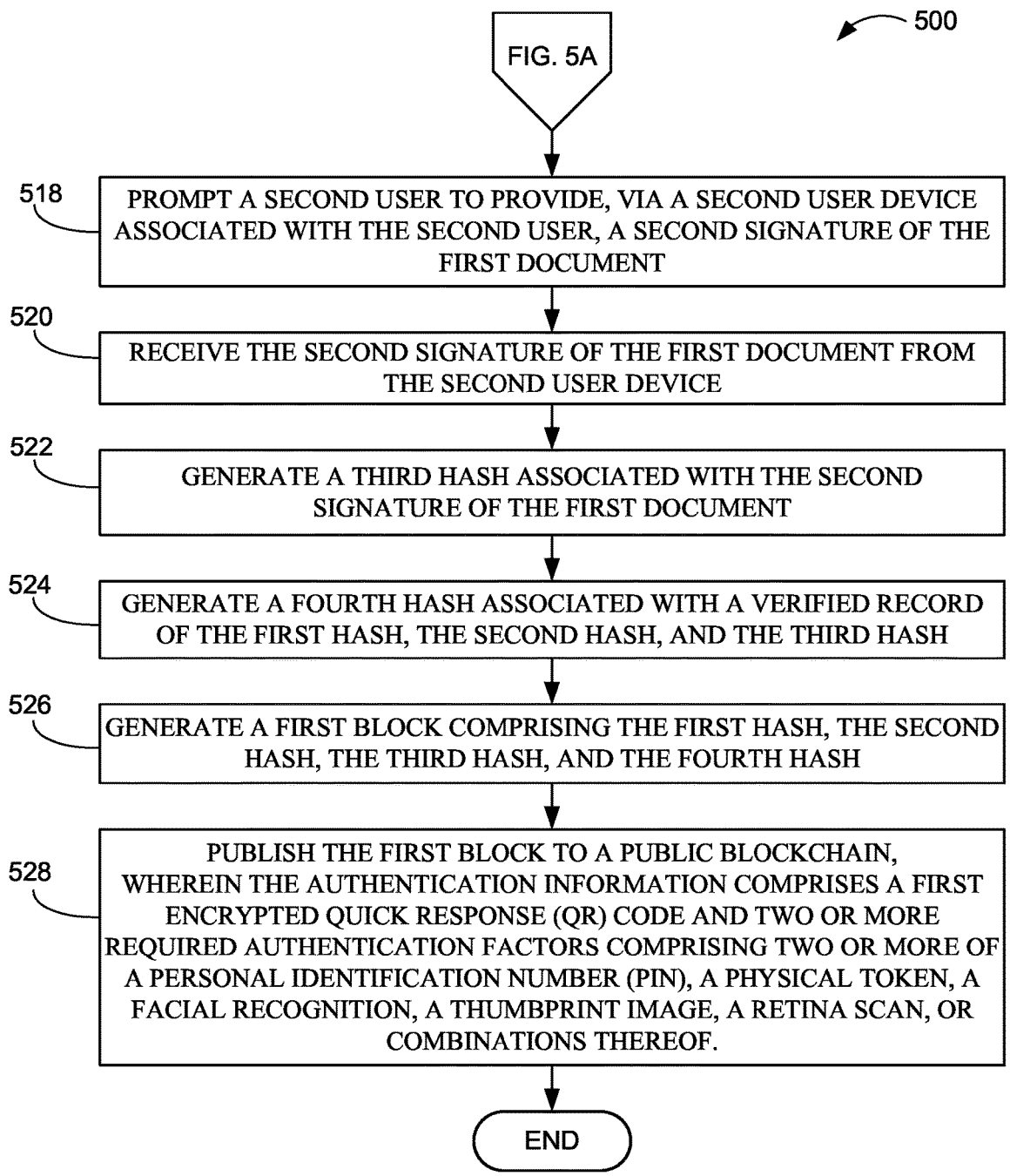

Method 500 of FIGS. 5A-5B is similar to method 400 of FIGS. 4A-4B, except that method 500 includes authentication information comprising an encrypted QR code and two or more other required authentication factors, while method 400 includes authentication information comprising three or more required authentication factors, one of which may be an encrypted QR code. The descriptions of blocks 502, 504, 506, 508, 510, 512, 514, 516, 518, 520, 522, 524, 526, and 528 are the same as or similar to the respective descriptions of blocks 402, 404, 406, 408, 410, 412, 414, 416, 418, 420, 422, 424, 426, and 428 of method 400 and as such, are not repeated herein for brevity.

Figure 6A:
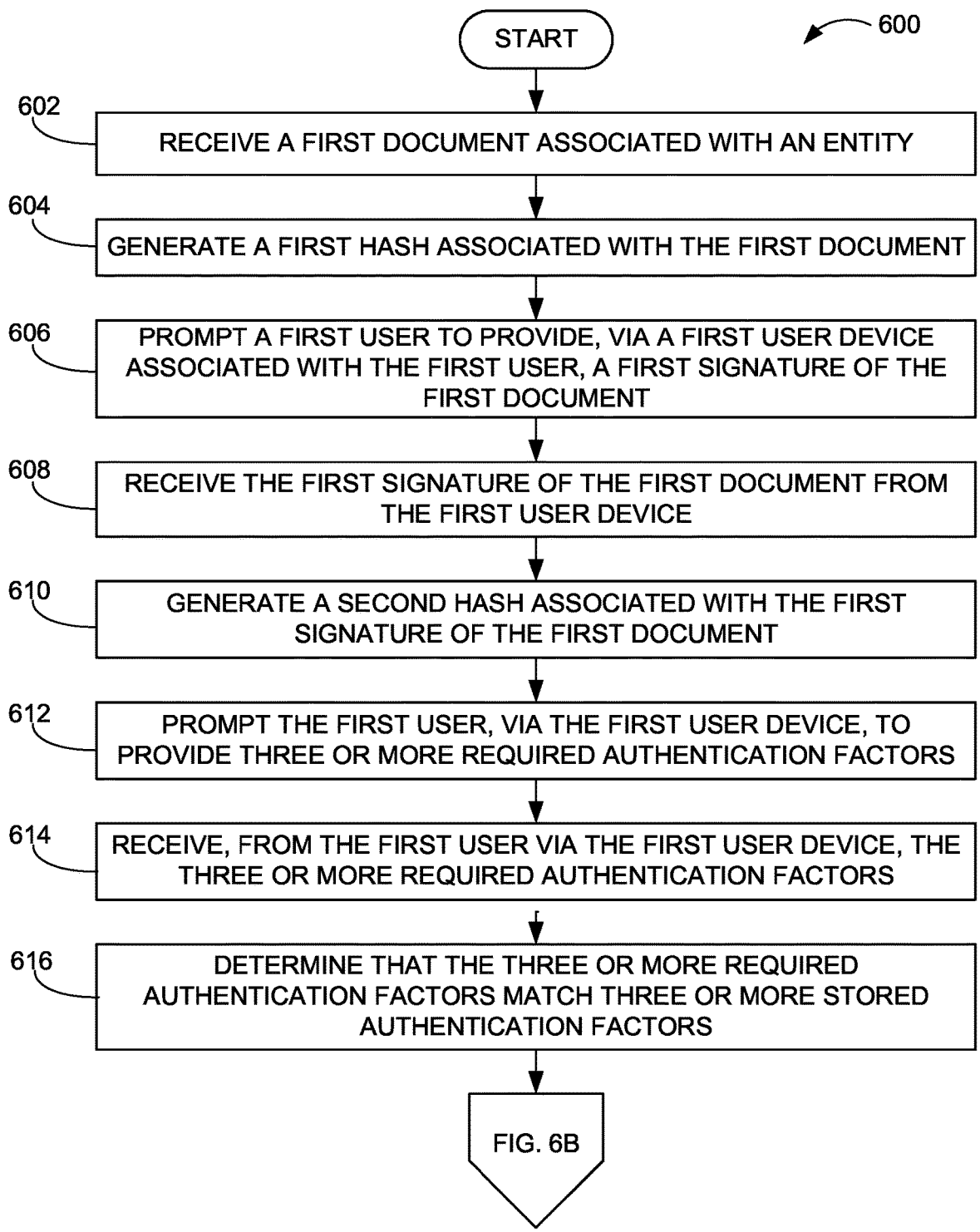
FIGS. 6A-6B are a flow diagram illustrating an exemplary method for conducting remote attestation, in accordance with certain embodiments of the disclosed technology.
Figure 6B:
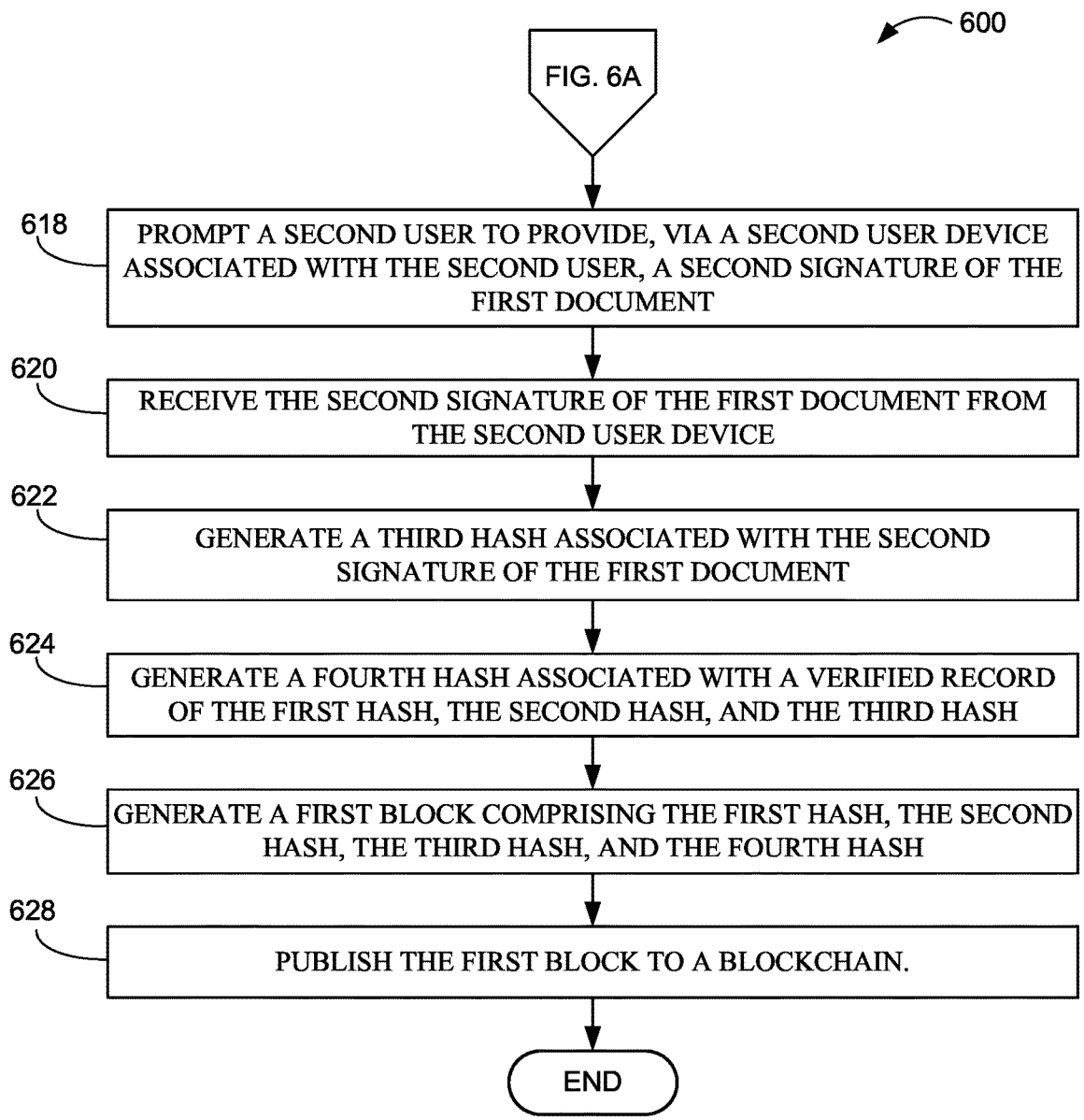

Method 600 of FIGS. 6A-6B is also similar to method 400 of FIGS. 4A-4B except that method 600 includes immediately determining that the received authentication factors match the stored authentication factors, while method 400 includes determining whether there is a match. The descriptions of blocks 602, 604, 606, 608, 610, 612, 614, 616, 618, 620, 622, 624, 626, and 628 are the same as or similar to the respective descriptions of blocks 402, 404, 406, 408, 410, 412, 414, 416, 418, 420, 422, 424, 426, and 428 of method 400 and as such, are not repeated herein for brevity.

Example Use Case

The following example use case describes an example of a typical user flow pattern. This section is intended solely for explanatory purposes and not in limitation.

In one example, a customer of a financial institution may receive a document from the financial institution, such as via a mobile application associated with the financial institution, wherein the document must be signed by the customer and notarized by a public notary in order to be considered properly authenticated. The customer may initiate a Zoom video conference call with a notary in order to have the document virtually notarized. The document itself, having been issued by the financial institution, may comprise some form of digital signature or "fingerprint" from the financial institution, such as a timestamp. The system (e.g., via remote attestation system 104) being utilized may be configured to generate a first hash associated with the financial institution's digital signature of the document. The system (e.g., via remote attestation system 104) may then prompt the customer to sign the document by transmitting a message to the customer via a GUI of the customer's laptop. The customer may then digitally sign the document by walking through the prompt provided on the GUI. The system may then generate a second hash associated with the customer's signature of the document and including the first hash.

The system (e.g., via remote attestation system 104) may then prompt the customer to provide required authentication information, including a PIN, a thumbprint image, and an encrypted QR code. The customer may enter her PIN, such as one she previously received from the financial institution for use in document authentication, by typing the PIN into the GUI of her laptop. The customer may then scan her thumbprint by using a thumbprint scanner connected to her laptop. Finally, the public notary, via the Zoom call, may tell the customer that the notary is going to send a push notification to the customer's mobile phone so that the customer may generate an encrypted QR code. The customer may then receive the notification via her mobile phone and walk through the prompts of the notification to generate the encrypted QR code on a GUI of the customer's mobile phone. The customer may then hold her mobile phone up to her laptop screen such that the system may recognize the generated QR code and may confirm alignment between the notary's push notification request sent to the customer's mobile phone, and the QR code generated and sent back by the customer's mobile phone. The notary may take a screen capture of the customer's generated QR code, if desired for archival purposes, by, for example, using a screen capture function on the notary's own laptop. The system may then also compare the received PIN and thumbprint image to a previously stored PIN and thumbprint image associated with the customer. Based on the comparison, the system may confirm a match between the received and stored PIN and thumbprint image.

Once the customer has been properly authenticated, the system may prompt the notary to sign the document by transmitting a message to the notary via a GUI of the notary's laptop. The notary may then digitally sign the document by walking through the prompt provided on the GUI. The system may then generate a third hash associated with the notary's signature of the document and including both the first and second hashes. The system may then generate a fourth hash associated with the document signed by both the customer and notary, and including a verified record of the first, second, and third hashes. The system may then generate a first block comprising the first, second, third, and fourth hashes. Finally, the system may publish the first block to a blockchain.

Clause 1: A system comprising: one or more processors; and memory in communication with the one or more processors and storing instructions that are configured to cause the system to: receive a first document associated with an entity; generate a first hash associated with the first document; prompt a first user to provide, via a first user device associated with the first user, a first signature of the first document; receive the first signature of the first document from the first user device; generate a second hash associated with the first signature of the first document; prompt the first user, via the first user device, to provide authentication information; receive, from the first user via the first user device, the authentication information; determine whether the authentication information matches stored authentication information; in response to determining that the authentication information matches the stored authentication information, prompt a second user to provide, via a second user device associated with the second user, a second signature of the first document; receive the second signature of the first document from the second user device; generate a third hash associated with the second signature of the first document; generate a fourth hash associated with a verified record of the first hash, the second hash, and the third hash; generate a first block comprising the first hash, the second hash, the third hash, and the fourth hash; and publish the first block to a public blockchain, wherein the authentication information comprises three or more required authentication factors comprising three or more of a personal identification number (PIN), a physical token, a facial recognition, a thumbprint image, a retina scan, an encrypted quick response (QR) code, or combinations thereof.

Clause 2: The system of clause 1, wherein the three or more required authentication factors are customizable by the first user and the second user.

Clause 3: The system of clause 1, wherein the instructions are further configured to cause the system to: prompt the first user, via a graphical user interface (GUI) of a third user device associated with the first user, to generate a first encrypted QR code; and receive, from the first user via the first user device, the first encrypted QR code, wherein at least one of the three or more required authentication factors comprises the first encrypted QR code.

Clause 4: The system of clause 3, wherein the first user device is a computer and the third user device is a mobile phone.

Clause 5: The system of clause 1, wherein the second user is a notary.

Clause 6: The system of clause 1, wherein the system is integrated into a video capable software.

Clause 7: A system comprising: one or more processors; and memory in communication with the one or more processors and storing instructions that are configured to cause the system to: receive a first document associated with an entity; generate a first hash associated with the first document; prompt a first user to provide, via a first user device associated with the first user, a first signature of the first document; receive the first signature of the first document from the first user device; generate a second hash associated with the first signature of the first document; prompt the first user, via the first user device, to provide authentication information; receive, from the first user via the first user device, the authentication information; determine whether the authentication information matches stored authentication information; in response to determining that the authentication information matches the stored authentication information, prompt a second user to provide, via a second user device associated with the second user, a second signature of the first document; receive the second signature of the first document from the second user device; generate a third hash associated with the second signature of the first document; generate a fourth hash associated with a verified record of the first hash, the second hash, and the third hash; generate a first block comprising the first hash, the second hash, the third hash, and the fourth hash; and publish the first block to a public blockchain, wherein the authentication information comprises a first encrypted quick response (QR) code and two or more required authentication factors comprising two or more of a personal identification number (PIN), a physical token, a facial recognition, a thumbprint image, a retina scan, or combinations thereof.

Clause 8: The system of clause 7, wherein prompting the first user to provide the authentication information comprises prompting the first user, via a graphical user interface (GUI) of a third user device associated with the first user, to generate the first encrypted QR code, and wherein receiving the authentication information comprises receiving, from the first user via the first user device, the first encrypted QR code.

Clause 9: The system of clause 8, wherein the first user device is a computer and the third user device is a mobile phone.

Clause 10: The system of clause 7, wherein the two or more required authentication factors are customizable by the first user and the second user.

Clause 11: The system of clause 7, wherein the second user is a notary.

Clause 12: The system of clause 7, wherein the system is integrated into a video capable software.

Clause 13: A system comprising: one or more processors; and memory in communication with the one or more processors and storing instructions that are configured to cause the system to: receive a first document associated with an entity; generate a first hash associated with the first document; prompt a first user to provide, via a first user device associated with the first user, a first signature of the first document; receive the first signature of the first document from the first user device; generate a second hash associated with the first signature of the first document; prompt the first user, via the first user device, to provide three or more required authentication factors; receive, from the first user via the first user device, the three or more required authentication factors; determine that the three or more required authentication factors match three or more stored authentication factors; prompt a second user to provide, via a second user device associated with the second user, a second signature of the first document; receive the second signature of the first document from the second user device; generate a third hash associated with the second signature of the first document; generate a fourth hash associated with a verified record of the first hash, the second hash, and the third hash; generate a first block comprising the first hash, the second hash, the third hash, and the fourth hash; and publish the first block to a blockchain.

Clause 14: The system of clause 13, wherein the three or more required authentication factors comprise three or more of a personal identification number (PIN), a physical token, a facial recognition, a thumbprint image, a retina scan, or combinations thereof.

Clause 15: The system of clause 13, wherein the three or more required authentication factors are customizable by the first user and the second user.

Clause 16: The system of clause 13, wherein the instructions are further configured to cause the system to: prompt the first user, via a graphical user interface (GUI) of a third user device associated with the first user, to generate a first encrypted quick response (QR) code; receive, from the first user via the first user device, the first encrypted QR code; and determine that the first encrypted QR code matches a stored encrypted QR code.

Clause 17: The system of clause 16, wherein the first user device is a computer and the third user device is a mobile phone.

Clause 18: The system of clause 13, wherein the second user is a notary.

Clause 19: The system of clause 13, wherein the system is integrated into a video capable software.

Clause 20: The system of clause 13, wherein the blockchain comprises a public blockchain.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for conducting remote attestation comprising: one or more processors; and
a memory in communication with the one or more processors and storing instructions that, when executed by the one or more processors, are configured to cause the system to:
receive a first document associated with an entity;
generate a first hash associated with the first document;
prompt a first user to provide, via a first user device associated with the first user, a first signature of the first document;
receive the first signature of the first document from the first user device;
generate a second hash associated with the first signature of the first document;
prompt the first user, via the first user device, to provide authentication information of the first user comprising three or more required authentication factors, each required authentication factor comprises a personal identification number (PIN), a physical token, a facial recognition, a thumbprint image, a retina scan, or an encrypted quick response (QR) code;
receive, from the first user via the first user device, the authentication information of the first user comprising the three or more required authentication factors;
determine whether the authentication information of the first user matches stored authentication information of the first user;
in response to determining that the authentication information of the first user matches the stored authentication information of the first user, prompt a second user to provide, via a second user device associated with the second user, a second signature of the first document, wherein the first user is different than the second user;
receive the second signature of the first document from the second user device;
generate a third hash associated with the second signature of the first document;
determine whether a predetermined threshold has been satisfied;
responsive to determining that the predetermined threshold has been satisfied, generate a fourth hash associated with a verified record of the first hash, the second hash, and the third hash;
generate a first block comprising the first hash, the second hash, the third hash, and the fourth hash; and
publish the first block to a public blockchain.

2. The system of claim 1, wherein the three or more required authentication factors are customizable by the first user and the second user.

3. The system of claim 1, wherein the instructions are further configured to cause the system to:
prompt the first user, via a graphical user interface (GUI) of a third user device associated with the first user, to generate a first encrypted QR code; and
receive, from the first user via the first user device, the first encrypted QR code,
wherein at least one of the three or more required authentication factors comprises the first encrypted QR code.

4. The system of claim 3, wherein the first user device is a computer and the third user device is a mobile phone.

5. The system of claim 1, wherein the second user is a notary.

6. The system of claim 1, wherein the system is integrated into a video capable software.

7. A system for conducting remote attestation comprising: one or more processors; and
a memory in communication with the one or more processors and storing instructions that, when executed by the one or more processors, are configured to cause the system to:
receive a first document associated with an entity;
generate a first hash associated with the first document;
prompt a first user to provide, via a first user device associated with the first user, a first signature of the first document;
receive the first signature of the first document from the first user device;
generate a second hash associated with the first signature of the first document;
prompt the first user, via the first user device, to provide authentication information of the first user comprising a first encrypted quick response (QR) code and two or more required authentication factors, each required authentication factor comprises a personal identification number (PIN), a physical token, a facial recognition, a thumbprint image, or a retina scan;
receive, from the first user via the first user device, the authentication information of the first user comprising the first encrypted QR code and the two or more required authentication factors;
determine whether the authentication information of the first user matches stored authentication information of the first user;
in response to determining that the authentication information of the first user matches the stored authentication information of the first user, prompt a second user to provide, via a second user device associated with the second user, a second signature of the first document, wherein the first user is different than the second user;
receive the second signature of the first document from the second user device;
generate a third hash associated with the second signature of the first document;
determine whether a predetermined threshold has been satisfied;
responsive to determining that the predetermined threshold has been satisfied, generate a fourth hash associated with a verified record of the first hash, the second hash, and the third hash;
generate a first block comprising the first hash, the second hash, the third hash, and the fourth hash; and
publish the first block to a public blockchain.

8. The system of claim 7, wherein prompting the first user to provide the authentication information of the first user comprises prompting the first user, via a graphical user interface (GUI) of a third user device associated with the first user, to generate the first encrypted QR code, and wherein receiving the authentication information of the first user comprises receiving, from the first user via the first user device, the first encrypted QR code.

9. The system of claim 8, wherein the first user device is a computer and the third user device is a mobile phone.

10. The system of claim 7, wherein the two or more required authentication factors are customizable by the first user and the second user.

11. The system of claim 7, wherein the second user is a notary.

12. A system for conducting remote attestation comprising:
one or more processors; and
a memory in communication with the one or more processors and storing instructions that, when executed by the one or more processors, are configured to cause the system to:
receive a first document associated with an entity;
generate a first hash associated with the first document;
prompt a first user to provide, via a first user device associated with the first user, a first signature of the first document;
receive the first signature of the first document from the first user device;
generate a second hash associated with the first signature of the first document;
prompt the first user, via the first user device, to provide three or more required authentication factors associated with the first user;
receive, from the first user via the first user device, the three or more required authentication factors associated with the first user;
determine that the three or more required authentication factors associated with the first user match three or more stored authentication factors associated with the first user;
in response to determining that the three or more required authentication factors associated with the first user match three or more stored authentication factors associated with the first user, prompt a second user to provide, via a second user device associated with the second user, a second signature of the first document, wherein the first user is different than the second user;
receive the second signature of the first document from the second user device;
generate a third hash associated with the second signature of the first document;
determine whether a predetermined threshold has been satisfied;
responsive to determining that the predetermined threshold has been satisfied, generate a fourth hash associated with a verified record of the first hash, the second hash, and the third hash;
generate a first block comprising the first hash, the second hash, the third hash, and the fourth hash; and
publish the first block to a blockchain.

13. The system of claim 12, wherein the three or more required authentication factors associated with the first user comprise three or more of a personal identification number (PIN), a physical token, a facial recognition, a thumbprint image, a retina scan, or combinations thereof.

14. The system of claim 12, wherein the three or more required authentication factors associated with the first user are customizable by the first user and the second user.

15. The system of claim 12, wherein the instructions are further configured to cause the system to:
prompt the first user, via a graphical user interface (GUI) of a third user device associated with the first user, to generate a first encrypted quick response (QR) code;
receive, from the first user via the first user device, the first encrypted QR code; and
determine that the first encrypted QR code matches a stored encrypted QR code.

16. The system of claim 15, wherein the first user device is a computer and the third user device is a mobile phone.

17. The system of claim 12, wherein the blockchain comprises a public blockchain.

18. The system of claim 1, wherein the first hash comprises a digital signature of an entity that issued the first document.

19. The system of claim 1, wherein the determining whether a predetermined threshold has been satisfied comprises determining whether a predetermined period of time has elapsed.

20. The system of claim 1, wherein the determining whether a predetermined threshold has been satisfied comprises determining whether a threshold number of transactions have been conducted.

* * * * *